US011824851B2

(12) United States Patent
Pasterk et al.

(10) Patent No.: US 11,824,851 B2
(45) Date of Patent: Nov. 21, 2023

(54) IDENTIFICATION DOCUMENT DATABASE

(71) Applicant: Jumio Corporation, Palo Alto, CA (US)

(72) Inventors: Thomas Pasterk, Vienna (AT); Thomas Krump, Buchkirchen (AT); Attila Balogh, Vienna (AT); Philipp Pointner, Vienna (AT); Labhesh Patel, Santa Clara, CA (US)

(73) Assignee: Jumio Corporation, Palo Alto, CA (US)

(*) Notice: Subject to any disclaimer, the term of this patent is extended or adjusted under 35 U.S.C. 154(b) by 578 days.

(21) Appl. No.: 17/016,656

(22) Filed: Sep. 10, 2020

(65) Prior Publication Data

US 2021/0075788 A1 Mar. 11, 2021

Related U.S. Application Data

(60) Provisional application No. 62/899,117, filed on Sep. 11, 2019.

(51) Int. Cl.
*H04L 9/40* (2022.01)
*G06Q 50/26* (2012.01)
(Continued)

(52) U.S. Cl.
CPC .......... *H04L 63/0861* (2013.01); *G06F 16/51* (2019.01); *G06F 16/532* (2019.01); *G06Q 10/10* (2013.01); *G06Q 30/0185* (2013.01); *G06Q 50/265* (2013.01); *G06V 30/413* (2022.01); *G06V 40/172* (2022.01); *G06V 40/50* (2022.01)

(58) Field of Classification Search
None
See application file for complete search history.

(56) References Cited

U.S. PATENT DOCUMENTS

| | | | |
|---|---|---|---|
| 8,782,077 | B1 | 7/2014 | Rowley et al. |
| 2008/0219560 | A1 | 9/2008 | Morimoto et al. |

(Continued)

OTHER PUBLICATIONS

Weng et al., "A Secure Perceptual Hash Algorithm for Image Content Authentication", 12th IFIP TC 6 / TC 11 International Conference on Communications and Multimedia Security (CMS), Ghent, BE, Oct. 2011, 14 pgs.

(Continued)

*Primary Examiner* — Cai Y Chen
(74) *Attorney, Agent, or Firm* — Morgan, Lewis & Bockius LLP

(57) ABSTRACT

Computer systems and methods are provided for determining authenticity of a document. A computer system receives first image data from a remote third party. The first image data includes a first image of a document. The computer system generates an image hash based on at least a portion of the received image data. The computer system compares the generated image hash with a stored image hash to determine whether the generated image hash meets image matching criteria. The stored image hash is associated with a first predetermined authentication decision. In accordance with a determination that the generated image hash meets the image matching criteria, the computer system transmits the first predetermined authentication decision to the remote third party.

18 Claims, 11 Drawing Sheets

(51) Int. Cl.

| | |
|---|---|
| ***G06F 16/51*** | (2019.01) |
| ***G06Q 10/10*** | (2023.01) |
| ***G06Q 30/018*** | (2023.01) |
| ***G06F 16/532*** | (2019.01) |
| ***G06V 30/413*** | (2022.01) |
| ***G06V 40/50*** | (2022.01) |
| ***G06V 40/16*** | (2022.01) |

(56) References Cited

U.S. PATENT DOCUMENTS

2017/0034160 A1* 2/2017 Brands .................... H04M 3/56
2017/0140174 A1* 5/2017 Lacey ................ G06Q 20/4016

OTHER PUBLICATIONS

Eskenazi et al., "A perceptual image hashing algorithm for hybrid document security", IAPR International Conference on Document Analysis and Recognition, Kyoto, JP, Oct. 20, 2018, 7 pgs.

* cited by examiner 700 (Cont.)

Figure 7B:
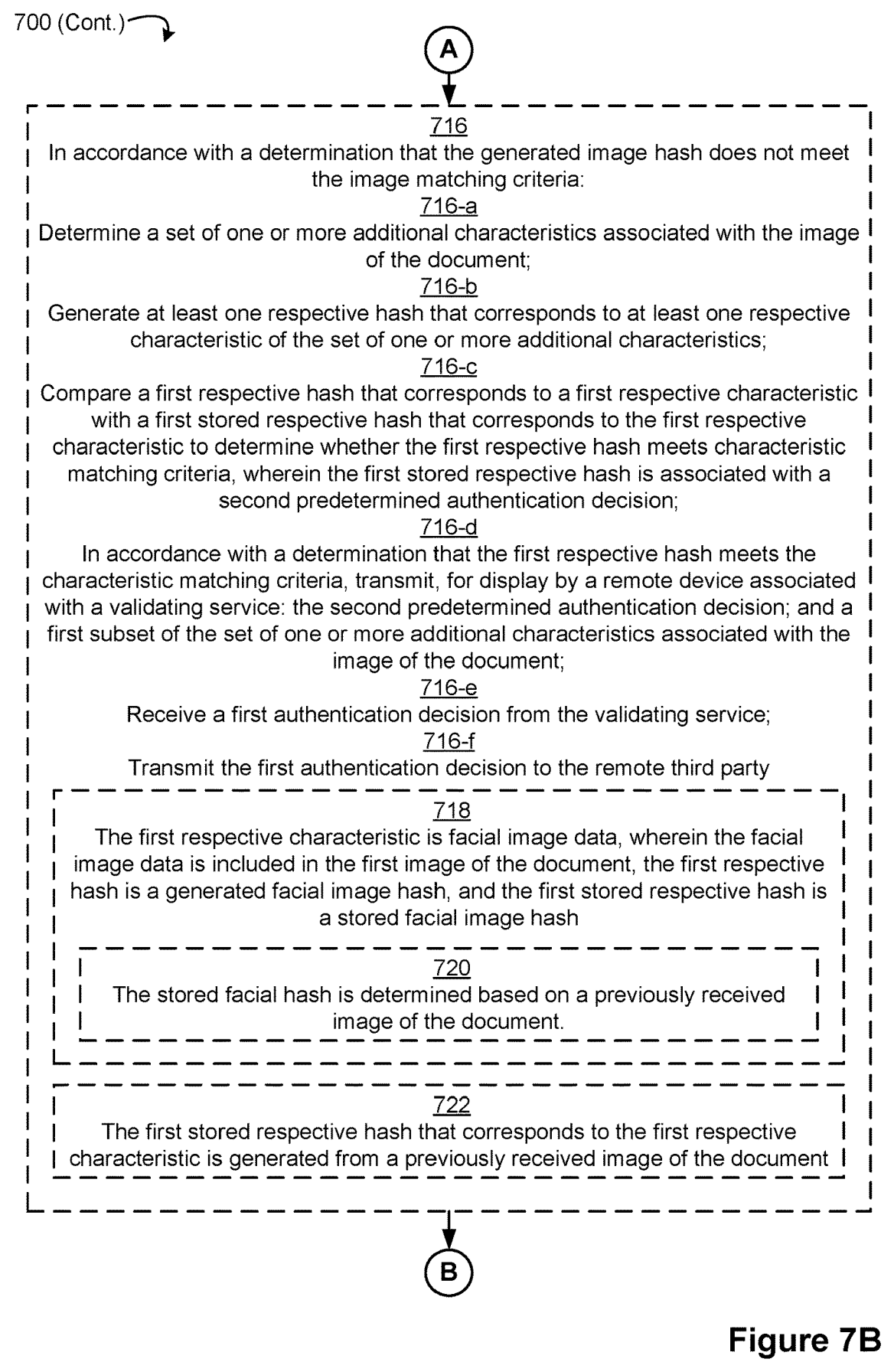

A

716
In accordance with a determination that the generated image hash does not meet the image matching criteria:

716-a
Determine a set of one or more additional characteristics associated with the image of the document;

716-b
Generate at least one respective hash that corresponds to at least one respective characteristic of the set of one or more additional characteristics;

716-c
Compare a first respective hash that corresponds to a first respective characteristic with a first stored respective hash that corresponds to the first respective characteristic to determine whether the first respective hash meets characteristic matching criteria, wherein the first stored respective hash is associated with a second predetermined authentication decision;

716-d
In accordance with a determination that the first respective hash meets the characteristic matching criteria, transmit, for display by a remote device associated with a validating service: the second predetermined authentication decision; and a first subset of the set of one or more additional characteristics associated with the image of the document;

716-e
Receive a first authentication decision from the validating service;

716-f
Transmit the first authentication decision to the remote third party

718
The first respective characteristic is facial image data, wherein the facial image data is included in the first image of the document, the first respective hash is a generated facial image hash, and the first stored respective hash is a stored facial image hash 720
The stored facial hash is determined based on a previously received image of the document.

722
The first stored respective hash that corresponds to the first respective characteristic is generated from a previously received image of the document

Figure 7C:
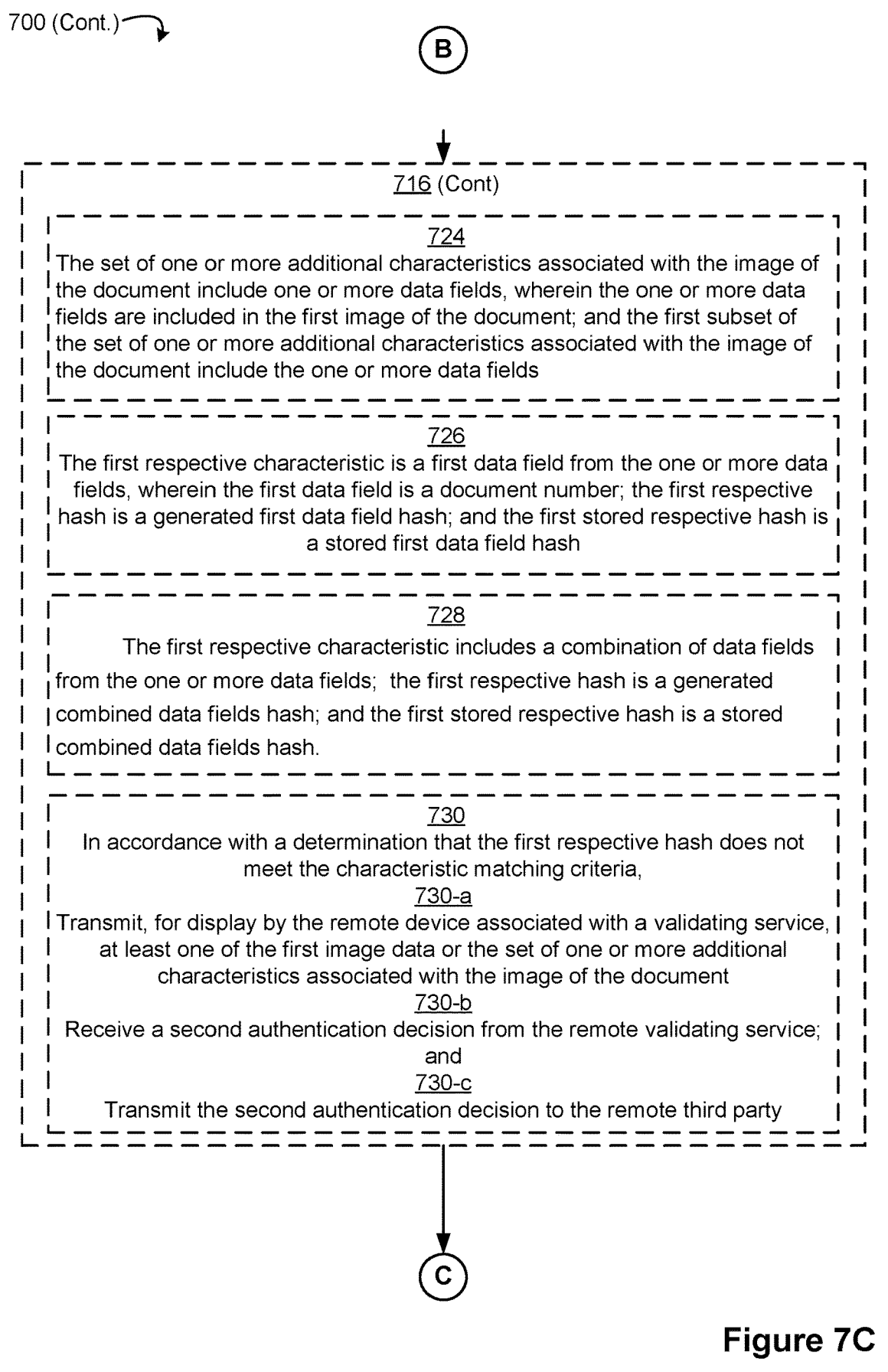

724
The set of one or more additional characteristics associated with the image of the document include one or more data fields, wherein the one or more data fields are included in the first image of the document; and the first subset of the set of one or more additional characteristics associated with the image of the document include the one or more data fields 726
The first respective characteristic is a first data field from the one or more data fields, wherein the first data field is a document number; the first respective hash is a generated first data field hash; and the first stored respective hash is a stored first data field hash 728
The first respective characteristic includes a combination of data fields from the one or more data fields; the first respective hash is a generated combined data fields hash; and the first stored respective hash is a stored combined data fields hash.

730
In accordance with a determination that the first respective hash does not meet the characteristic matching criteria, 730-a
Transmit, for display by the remote device associated with a validating service, at least one of the first image data or the set of one or more additional characteristics associated with the image of the document 730-b
Receive a second authentication decision from the remote validating service; and 730-c
Transmit the second authentication decision to the remote third party

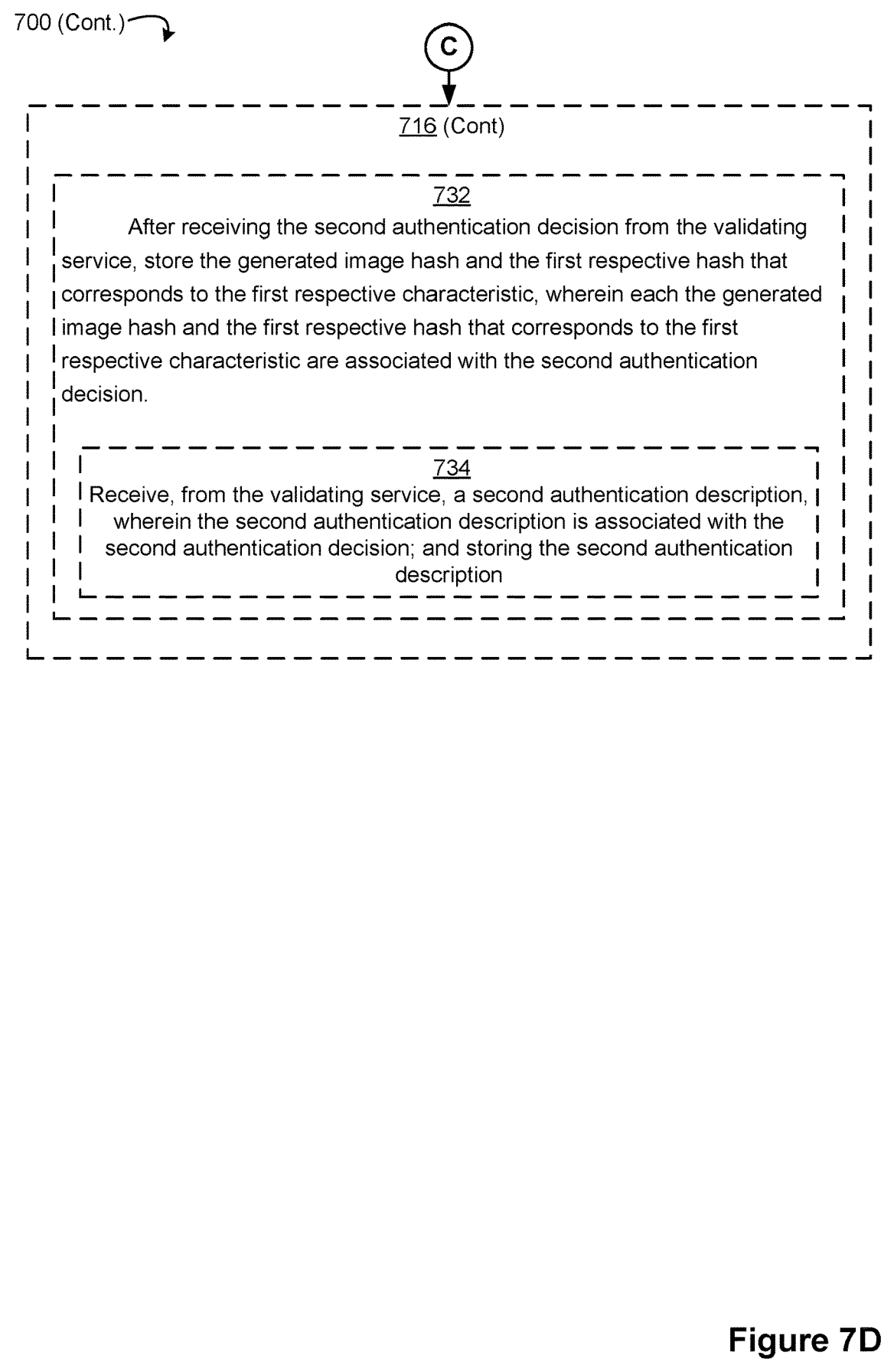

After receiving the second authentication decision from the validating service, store the generated image hash and the first respective hash that corresponds to the first respective characteristic, wherein each the generated image hash and the first respective hash that corresponds to the first respective characteristic are associated with the second authentication decision.

734

Receive, from the validating service, a second authentication description, wherein the second authentication description is associated with the second authentication decision; and storing the second authentication description

Figure 7D

IDENTIFICATION DOCUMENT DATABASE

RELATED APPLICATION

This application claims priority to U.S. Provisional Application No. 62/899,117, filed Sep. 11, 2019, which is hereby incorporated by reference in its entirety.

TECHNICAL FIELD

This application relates generally to document authentication, and more particularly, to determining whether data associated with received user identification information corresponds to data associated with a document that has a previously determined status.

BACKGROUND

Collected personally identifiable information (PII) is increasingly subject to regulations (e.g., privacy regulations, such as the General Data Protection Regulation) that place restrictions on use of PII. For example, regulations place limits on storage of PII collected by an entity.

A document submitted for identification information may be determined to be authentic or fake. It would be beneficial to use previously determined information about a document when evaluating identifying information submitted by a user.

SUMMARY

There is a need for systems and/or devices that generate anonymized data based on user-submitted information to determine whether the user-submitted information (e.g., characteristics of an image of an identification document) matches previously submitted information (e.g., characteristics of an image of an identification document that has been determined to be authentic or fraudulent). Such systems, devices, and methods optionally complement or replace conventional systems, devices, and methods for extracting information from captured data.

In accordance with some embodiments, a method is performed at a computer having one or more processors and memory storing instructions for execution by the one or more processors. The method includes receiving first image data from a remote third party. The first image data including a first image of a document. The method further includes generating an image hash based on at least a portion of the received image data. The method further includes comparing the generated image hash with a stored image hash to determine whether the generated image hash meets image matching criteria. The stored image hash is associated with a first predetermined authentication decision. The method further includes, in accordance with a determination that the generated image hash meets the image matching criteria, transmitting the first predetermined authentication decision to the remote third party.

In accordance with some embodiments, an electronic device (e.g., a server system, a client device, etc.) includes one or more processors and memory storing one or more programs configured to be executed by the one or more processors. The one or more programs include instructions for performing the operations of the method described above. In accordance with some embodiments, a computer-readable storage medium has stored therein instructions that, when executed by an electronic device, cause the server system to perform the operations of the method described above.

BRIEF DESCRIPTION OF THE DRAWINGS

So that the present disclosure can be understood in greater detail, features of various embodiments are illustrated in the appended drawings. The appended drawings, however, merely illustrate pertinent features of the present disclosure and are therefore not limiting.

FIGS. 7A-7D illustrate a flow diagram for comparing a generated image hash with a stored image hash that is associated with a predetermined authentication decision.

In accordance with common practice, some of the drawings may not depict all of the components of a given system, method, or device. Finally, like reference numerals denote like features throughout the specification and figures.

DETAILED DESCRIPTION

Figure 1:
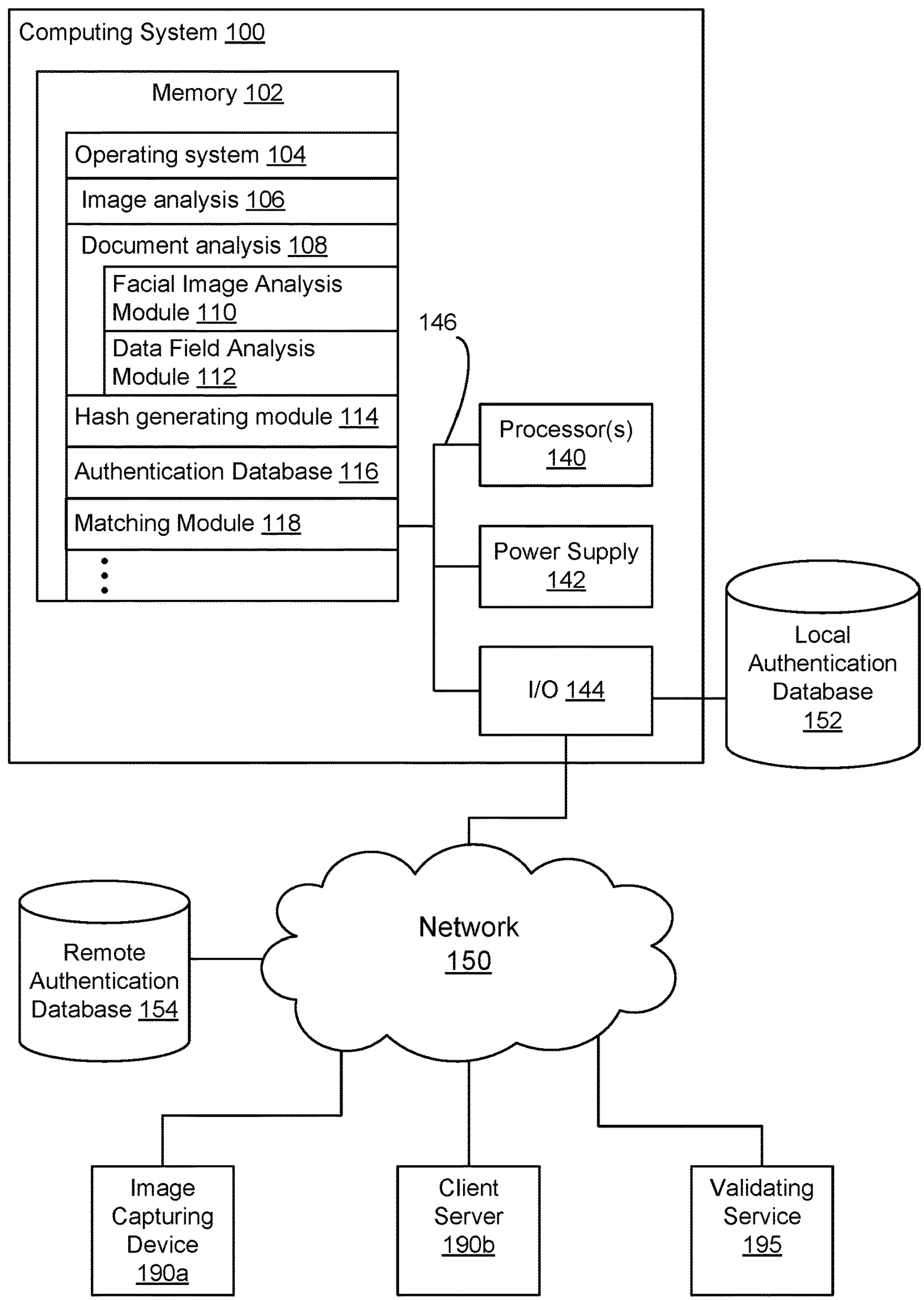
FIG. 1 is a system diagram of a computing system and its context, in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first client device could be termed a second client device, and, similarly, a second client device could be termed a first client device, without departing from the scope of the various described embodiments. The first client device and the second client device are both client devices, but they are not the same client device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Collected PII is increasingly subject to regulations (e.g., privacy regulations, such as the General Data Protection Regulation) that place restrictions on use of PII. For example, it may be necessary for PII collected by an entity to be stored separately from PII collected by any other entity.

Comparing data (e.g., PII) of documents previously determined to be fraudulent or authentic with data of a user document submitted for verification can improve the process of determining whether a document is valid and authentic. For example, a person attempting to use a fraudulent document may submit a series of images in which details of the fraudulent document (e.g., a name, and address, a facial image, etc.) have been varied (e.g., with the expectation that one of the variations will succeed even if other variations are matched to an identification document known to be fake). By utilizing previous determinations (e.g., known authentic or known fake) about an identification document or aspects (e.g., document image, facial image, and/or content of one or more data fields) of the identification document, the efficiency with which the verification is performed, the accuracy of verification determinations, and/or the consistency of verification determinations is improved. Improving the efficiency with which verification determinations are made reduces processing demands on a verification system (e.g., by reducing the amount of data that is sent to a human reviewer or eliminating the need to send data to a human reviewer).

In some embodiments, verification determination involves generating a hash of received user data (e.g., a received image captured of an identification document of the user).

The generated hash is compared with a stored hash that corresponds to a prior analysis of a previously submitted document. For example, prior analysis determined that the previously submitted document is fraudulent (e.g., a well-known fake) or authentic. The hashes may be generated using document image data that includes personally identifiable information (PII). If, however, the input data changes, a different hash is generated. Typically, a hash improves data anonymity as it is a representation of data and not the data itself.

A hash (also referred to as a "hash value") is the result of a transformation of data (e.g., a value returned by a hash function). In some embodiments, a hash cannot be decrypted. In some embodiments, a hash cannot be used recover the data that was transformed by the hash function (e.g., due to lossy compression of the data). Each time the same data is transformed by the hash function, the same resulting hash value is produced. In this way generating hashes enables determining whether information from submitted user data (e.g., a captured image of a identification document) corresponds to information from previously submitted user data (e.g., a previously submitted fraudulent identification document) without revealing PII contained in either document.

A user authentication service that determines document authenticity may have access to hashes based on PII collected by multiple entities. In some embodiments, to retain data without PII, document image data (e.g., that includes PII) that is received from an entity is used to generate a hash (e.g., without using document data of any other entities). In some embodiments, the hash is used to authenticate documents and/or complete subsequent transactions. The non-identifying hashes (e.g., information that does not include PII data) generated using received document image data (e.g., that includes PII) may be used for authenticating documents received from multiple entities. For example, a generated hash for a received document may be compared to a stored hash generated from a previously authenticated document, and based on a determination that matching criteria is met, the received document can be authenticated (or determined to be fraudulent) automatically. In this way, although PII for respective user bases may be required to be stored separately by (or on behalf of) separate entities, storing hashed information associated with PII enables storage of PII collected by multiple entities.

FIG. 1 is a system diagram of a computer system 100 (also referred to herein as an "authentication server"), in accordance with some embodiments. The authentication server 100 typically includes a memory 102, one or more processor(s) 140, a power supply 142, an input/output (I/O) subsystem 144, and a communication bus 146 for interconnecting these components.

The processor(s) 140 execute modules, programs, and/or instructions stored in the memory 102 and thereby perform processing operations.

In some embodiments, the memory 102 stores one or more programs (e.g., sets of instructions) and/or data structures, collectively referred to as "modules" herein. In some embodiments, the memory 102, or the non-transitory computer readable storage medium of the memory 102 stores the following programs, modules, and data structures, or a subset or superset thereof:

- an operating system 104;
- an image analysis module 106 for processing a received image and identifying a document included in the received image;
- a document analysis module 108 for processing (e.g., analyzing) a document in a received image and determining characteristics of the document. The document analysis module 108 may include the following modules (or sets of instructions), or a subset or superset thereof:
  - a facial image analysis module 110 for identifying and/or processing (e.g. analyzing and/or determining) facial image data of a document. The facial image analysis module 110 performs facial recognition techniques on facial image data for analysis and comparisons. In some embodiments, facial recognition techniques include identifying facial features, face shape, face depth, face contour, etc.; analyzing the relative position, size, and/or shape of the eyes, nose, mouth, cheekbones, jaw, etc.; and/or using these features to search for other images with matching features; and a data field analysis module 112 for identifying and/or processing (e.g. analyzing and/or determining) information and/or characteristics included in a document. In some embodiments, the data field analysis module 112 determines portions of the document that include text. In some embodiments, the data field analysis module 112 determines saliency and/or readability of the text within the portions of the document. In some embodiments, the data field analysis module 112 identifies and/or determines text in the document using character recognition techniques such as optical character/word recognition (OCR), optical word recognition, intelligent character recognition (ICR), intelligent word recognition (IWR). In some embodiments, character recognition techniques include targeting typewritten text (e.g., one glyph, character, and/or word at a time) and/or targeting handwritten printscript and/or cursive text (e.g., one glyph, character, and/or word at a time);

a hash generating module 114 for generation a hash based on received image data. In some embodiments, a hash is generated based on the image data, a document included in the image data, and/or a characteristic of the document. In some embodiments, the has is generated using at least one of MDS, SHA1, SHA224, SHA256, SHA384, SHA512 and/or RIPEMD160 hash generator;

an authentication database 116 for storing and/or accessing previously generated hashes that are associated with an authentication decision. In some embodiments, a stored hash corresponds to a previously received image, a document, and/or a characteristic of the document. In some embodiments, an authentication decision includes a rejection and/or authorization decision;

a matching module 118 for processing (e.g., comparing) and determining whether a generated hash for received image data meets matching criteria with a stored hash.

The above identified modules (e.g., data structures and/or programs including sets of instructions) need not be implemented as separate software programs, procedures, or modules, and thus various subsets of these modules may be combined or otherwise re-arranged in various embodiments. In some embodiments, the memory 102 stores a subset of the modules identified above. In some embodiments, a remote authentication database 154 and/or a local authentication database 152 store a portion or all of one or more modules identified above. Furthermore, the memory 102 may store additional modules not described above. In some embodiments, the modules stored in the memory 102, or a non-transitory computer readable storage medium of the memory 102, provide instructions for implementing respective operations in the methods described below. In some embodiments, some or all of these modules may be implemented with specialized hardware circuits that subsume part or all of the module functionality. One or more of the above identified elements may be executed by one or more of the processor (s) 140. In some embodiments, one or more modules (e.g., image analysis module 106) is stored on, executed by, and/or is distributed across one or more of multiple devices (e.g., authentication server 100, a remote third party (e.g., image capturing device 190*a* and/or client server 190*b*), and/or a validating service 195)

In some embodiments, the I/O subsystem 108 communicatively couples the computing system 100 to one or more devices such as a local extraction database 152, a remote extraction database 154, a remote third party (e.g., an image capturing device 190*a* (e.g., a user device such as a phone, a laptop, a kiosk, a computer, etc.) and/or a client server 190*b* (e.g., merchant system that receives and/or capturers information corresponding to a user), and/or a validating service 195 via a communications network 150 and/or via a wired and/or wireless connection. In some embodiments, the communications network 150 is the Internet.

The communication bus 146 optionally includes circuitry (sometimes called a chipset) that interconnects and controls communications between system components.

In some embodiments, an authentication system for processing authentication includes a server computer system 100. In some embodiments, an authentication system for processing authentication includes a server computer system 100 that is communicatively connected (e.g., via a network 170 and/or an I/O subsystem 108) to one or more remote third parties (e.g., image capturing devices 190*a* and/or client server 190*b*). In some embodiments, the authentication system receives an authentication request (e.g., from an image capturing device 190*a* that captures an image of a document and/or from a client server 190*b* that receives an image of a document from a user device). For example, the authentication request is a request to authenticate a document from a captured image of the document (e.g., an image provided by a user to perform a transaction or request access to a system or physical location). Alternatively and/or additionally, an authentication request includes a request for address verification (e.g., utilizing utility bills, telephone bills, etc. to authenticate a person's address). In some embodiments, a remote third party system is a client server 190*b*, for example, a system of a merchant, bank, transaction processor, computing system or platform, physical access system, or another user.

Figure 3:
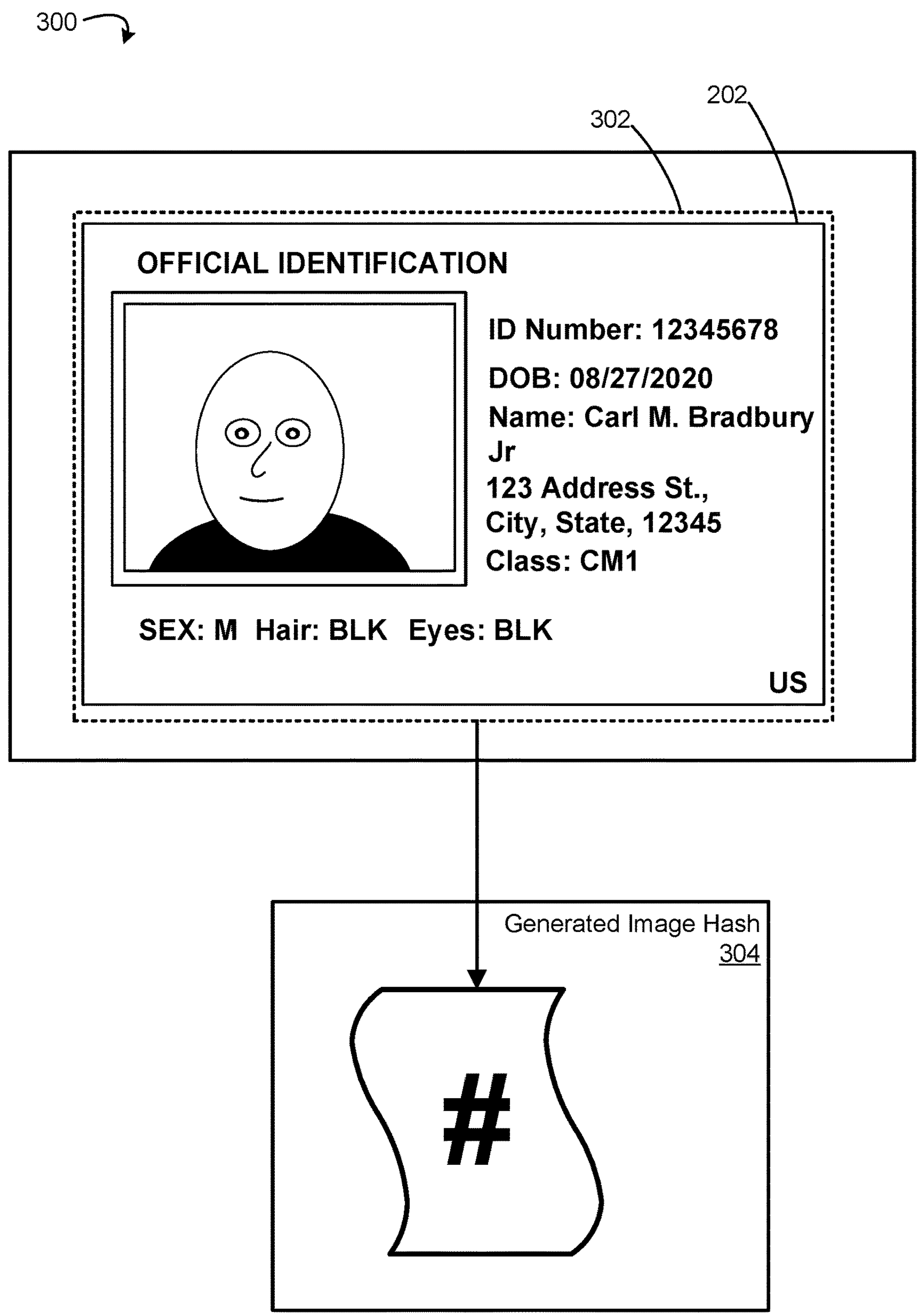
FIG. 3 illustrates generation of an image hash based on the reference image submitted by a remote third party, in accordance with some embodiments.

In some embodiments, an authentication request includes captured image data, such as document image 200 illustrated in FIG. 3. For example, document image 200 is an image of an identification document 202 for a user received from a remote third party such as an image capture device 190*a* (e.g., user device and/or kiosk with a camera, scanner, video camera etc.) and/or a client server 190*b* (e.g., a system of a merchant, bank, transaction processor, computing system or platform, physical access system, or another user). In some embodiments, the document image 200 is processed to generate a hash representative of the received document image 200, the document 202, and/or document characteristics (e.g., facial image 204 and/or one or more data fields 206). In some embodiments, the authentication server 100 compares the generated hash with stored hashes of previously authenticated documents images (e.g., included in authentication database 116, local authentication database 152, and/or remote authentication database 154) to authenticate the document image 200. In some embodiments, the authentication server 100 transmits, for display by a remote device associated with a validating service 195, the document image 200 and/or document characteristics (e.g., facial image data 204 and/or data fields 206). In some embodiments, the authentication server 100 receives an authentication decision and provides the authentication decision to a remote third party (e.g., image capturing device 190*a* and/or client server 190*b*).

Figure 2:
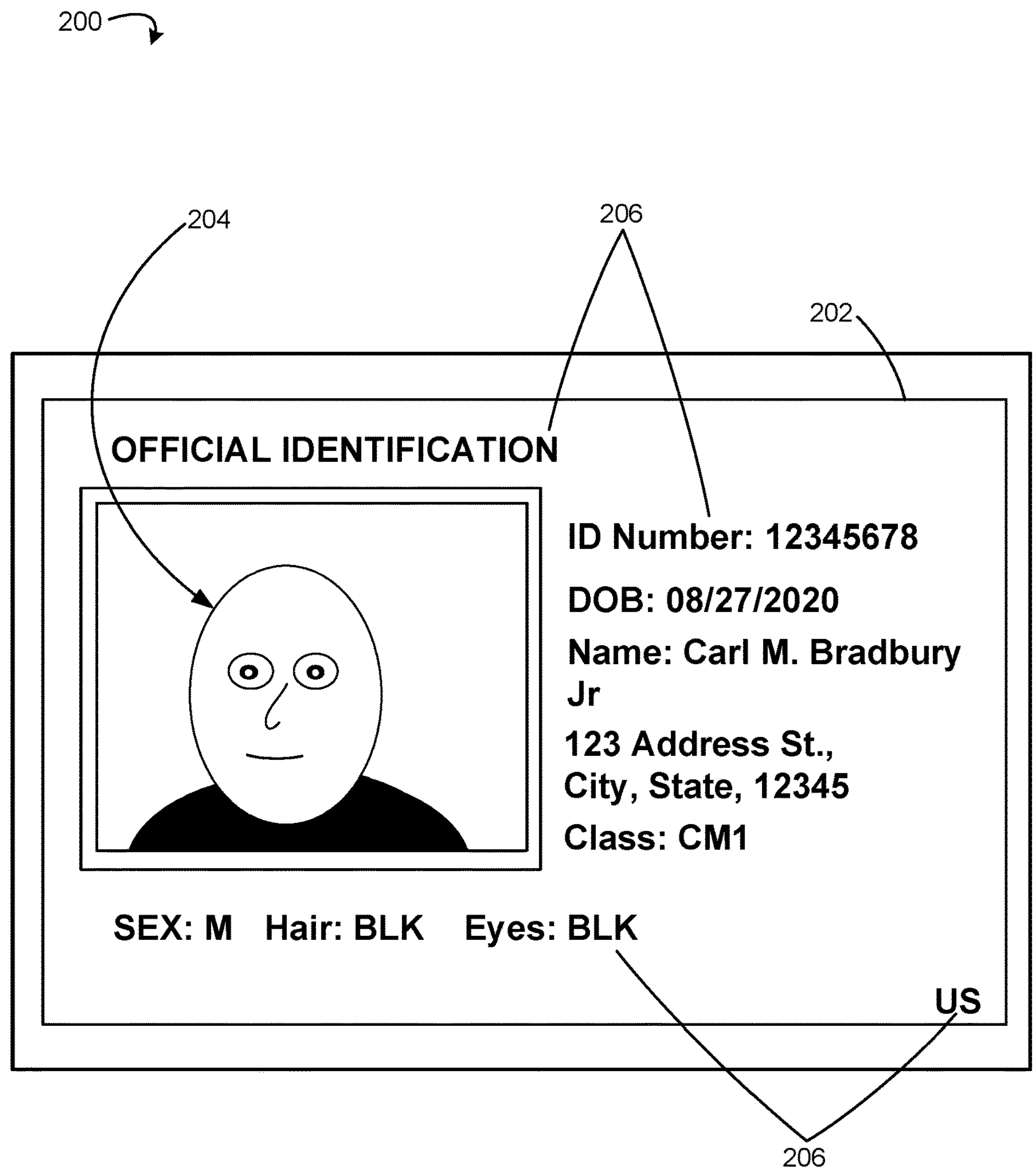
FIG. 2 illustrates a reference image submitted by a remote third party for authentication, in accordance with some embodiments.

FIG. 2 illustrates a document image 200, in accordance with some embodiments. Document image 200 is, for example, an image of an identification document 202. In some embodiments, document 202 includes characteristics associated with document 202, such as facial image data 204 and/or one or more data fields 206. In some embodiments, the one or more data fields 206 include information corresponding to the document 202 such as a type (e.g., region, and/or class) of the document, a name, an address (e.g. street, city, country, etc.), a document number, a date of birth, an issue date, gender identification, appearance data (e.g., eye color, hair color), physical data (e.g., height and/or weight), a hand written signature, and/or restriction data (e.g. corrective lenses). In some embodiments, the name includes a first name, last name, middle name, prefix, and/or suffix. In some embodiments, the document is, for example, a passport, driver's license, identification, invoice (e.g., utility bill, phone bill, etc.), financial instrument (e.g., credit card or debit card), facility access card, security card, etc. In some embodiments, document 202 includes barcodes and/or machine-readable zones.

FIG. 3 illustrates generation of an image hash 300 based on a document image received from a remote third party, in accordance with some embodiments. In some embodiments, the document image 200 is received by an authentication server 100 and processed to generate an image hash 304. In some embodiments, the document image 200 is used to generate the image hash 304. Alternatively and/or additionally, in some embodiments, document 200 analyzed to determine one or more portions of document image 200. In some embodiments, the one or more portions of document image 200 are used to generate an image hash 304. For example, in some embodiments, a determined image portion 302 of document image 200 that includes document 202 (e.g., a crop of the image to exclude portions of the image that are not document 202) is identified and the determined image portion document 302 is used to generate an image hash 304.

In some embodiments, the generated image hash 304 is determined by applying a hash function to determine a hash value (e.g., a fixed-length value) based on received document image 200 (e.g., values of pixels of the received document image 200). In some embodiments, the generated image hash 304 is compared with a stored image hash (e.g., in a set of stored hashes corresponding to documents determined to be fraudulent and/or in a set of stored hashes corresponding to documents determined to be authentic, such as one or more sets included in authentication database 116, local authentication database 152, and/or remote authentication database 154) to determine whether image matching criteria are met. In some embodiments, the stored image hash is generated from a previously received image of a document (e.g., document 202).

Figure 4:
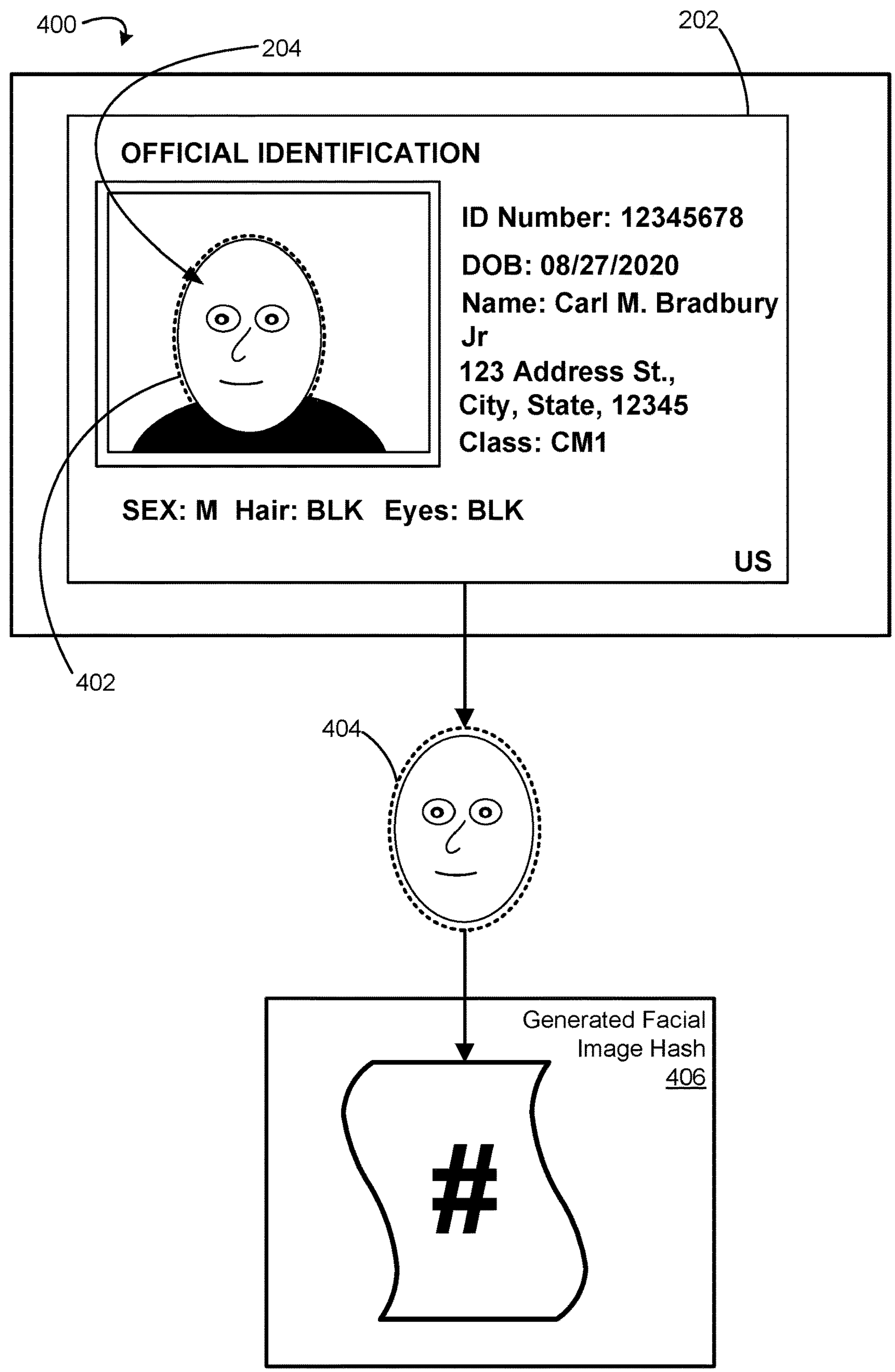
FIG. 4 illustrates generation of a facial image hash based on the reference image submitted by a remote third party, in accordance with some embodiments.

FIG. 4 illustrates generation of a facial image hash 400 based on the document image 200 received from a remote third party, in accordance with some embodiments. In some embodiments, document image 200 is analyzed to determine a portion of document 402 that includes facial image data 204. In some embodiments, the facial image data 402 portion of document image 200 is used after generated image hash 304 is determined to not be a match for a stored hash (e.g., in a set of stored hashes corresponding to documents determined to be fraudulent and/or in a set of stored hashes corresponding to documents determined to be authentic). In some embodiments, the facial image portion 402 of document image 200 is used to determine values that correspond to one or more facial features that correspond to extracted facial image 404 that corresponds to facial image portion 402. For example, facial recognition techniques (e.g., as described with regard to facial image analysis module 110; FIG. 1) are used to determine a set of one or more vectors corresponding to the facial features. In some embodiments, the set of one or more vectors include values that represent characteristics of extracted facial image 404, such as the distance between eyes; the separation between the nose and the mouth; the location of the nose; mouth; eyes; etc.

In some embodiments, the facial image portion 402 of document image 200 is used to generate a facial image hash 406. Alternatively and/or additionally, in some embodiments, values that correspond to facial features are used to generate the facial image hash 406. In some embodiments, the generated facial image hash 406 is determined by applying a hash function to determine a hash value (e.g., a fixed-length value) based on extracted facial image 404 (e.g., values of pixels that correspond to extracted facial image 404 and/or a set of one or more vectors that correspond to facial features determined based on extracted facial image 404). In some embodiments, the generated facial image hash 406 is compared with a stored facial image hash (e.g., in a set of stored hashes corresponding to documents determined to be fraudulent and/or in a set of stored hashes corresponding to documents determined to be authentic, such as one or more sets included in authentication database 116, local authentication database 152, and/or remote authentication database 154) to determine whether facial image matching criteria are met. In some embodiments, the stored facial image hash is generated from a previously received image of a document that includes facial image data.

Figure 5:
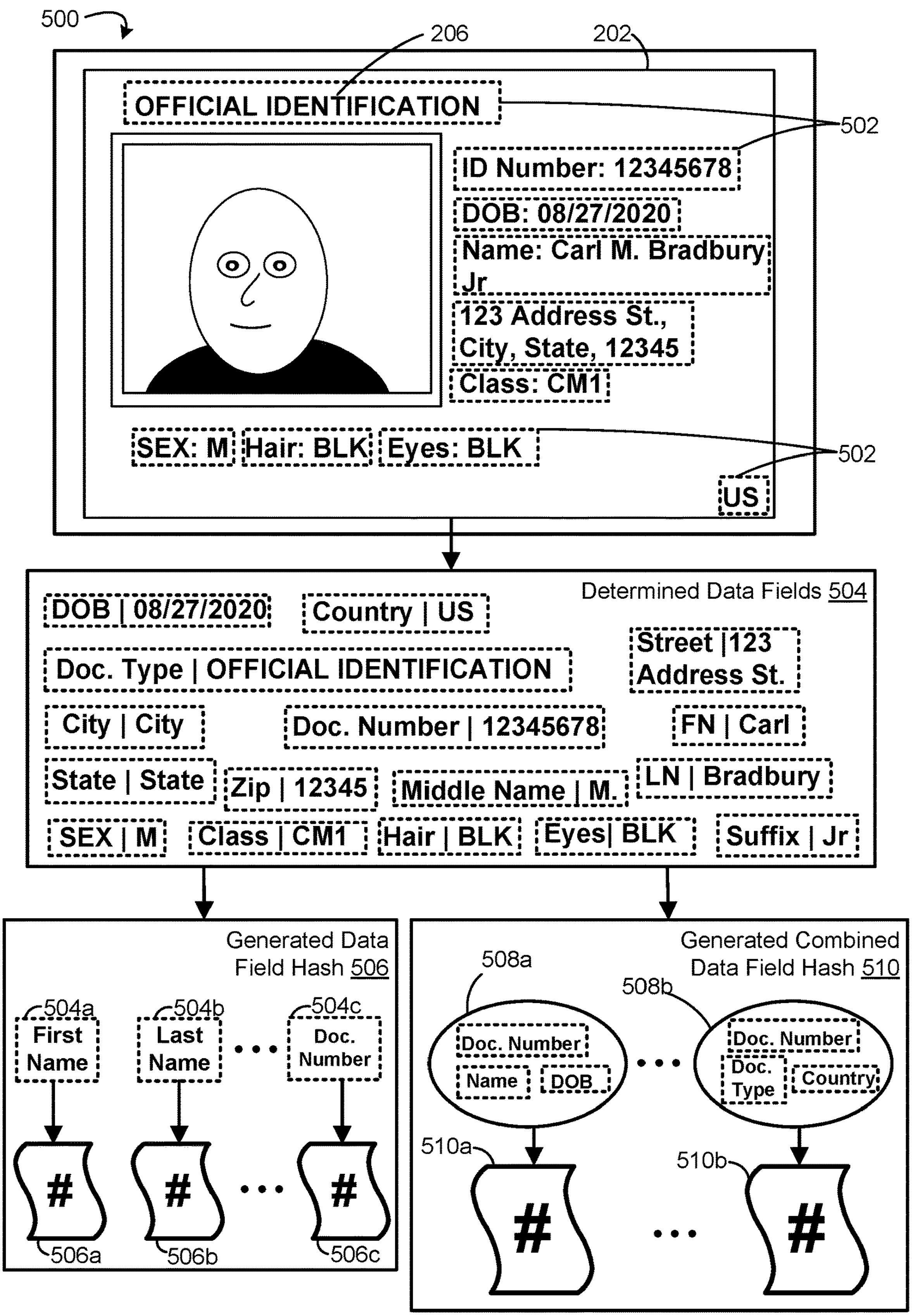
FIG. 5 illustrates generation of data field hashes based on the reference image submitted by a remote third party, in accordance with some embodiments.

FIG. 5 illustrates generation of a hash 500 based on one or more data fields in the reference image submitted by a remote third party, in accordance with some embodiments. In some embodiments, analyzing document image 200 determines one or more portions of document 502 that include characteristics associated with document 202, such as data fields 206. In some embodiments, the data field portions 502 of document image 200 are used after generated image hash 304 is determined to not be a match for a stored hash and/or after generated facial image hash 406 is determined to not be a match for a stored facial image hash. In some embodiments, one or more determined data field portions 502 of document image 200 include and/or are associated with categories and/or labels, such as one or more respective data fields 206 as described with regard to FIG. 2.

In some embodiments, the data field portions 502 of document image 200 are used to determine values and/or text that correspond to information of document 202. For example, character recognition techniques (e.g., as described with regard the data field analysis module 112; FIG. 1) are used to determine values and/or text corresponding to the data field portions 502. The values and/or text represent the information corresponding to determined data fields 504, such as first name (e.g., FN|Carl), last name (e.g., LN|Bradbury), document number (e.g., Doc. Number|12345678), document type (e.g., identification), etc. In some embodiments, a respective determined data field includes a label indicating a field type and the text and/or value in the field (e.g., FN|Carl). In some embodiments, a respective determined data field includes the text and/or value in the field without a label (e.g., Carl).

In some embodiments, a set of one or more fields from determined data fields 504 is used to generate a corresponding data field hash 506. In some embodiments, the determined data fields 504 corresponding to the first name 504*a*, last name 504*b*, and document number 504*c* are used to generate corresponding a data field hash 506 (e.g., the data field hash 506 is determined based on a combination (e.g., concatenation) of first name 504*a*, last name 504*b*, and document number 504*c*). In some embodiments, a separate has is generated for each respective data field (e.g. first name hash 506*a*, last name hash 506*b*, and document number hash 506*c*). In some embodiments, data fields 508*a* (e.g., document number, name, and date of birth are used to generate a combined data field hash 510*a* (e.g., the data field hash 510*a* is determined based on a combination (e.g., concatenation) of document number, name, and date of birth). Similarly, in another example, a combination of data fields 508*b* (e.g., corresponding to determined data fields 504 for document number, document type, and/or country) are used to generate another combined data field hash 510*b*. The combination of determined data fields 508 may include any variation of the determined data fields 504. The generated combined data field hash 510 corresponds to any determined combination of determined data fields 508.

In some embodiments, a generated data field hash 506 is determined by applying a hash function to determine a hash value (e.g., a fixed-length value) to a set of one or more fields from determined data fields 504 (e.g., from the corresponding determined data field 504 and/or corresponding data field portions 502). In some embodiments, the generated data field hash 506 is compared with a stored data field hash (e.g., included in authentication database 116, local authentication database 152, and/or remote authentication database 154) to determine whether data field matching criteria are met. In some embodiments, the stored data field hash is generated from a previously received image of a document that includes data field data.

In some embodiments, a generated combined data field hash 510 is determined by applying a hash function to determine a hash value (e.g., a fixed-length value) to data fields 508*a*.

Figure 6:
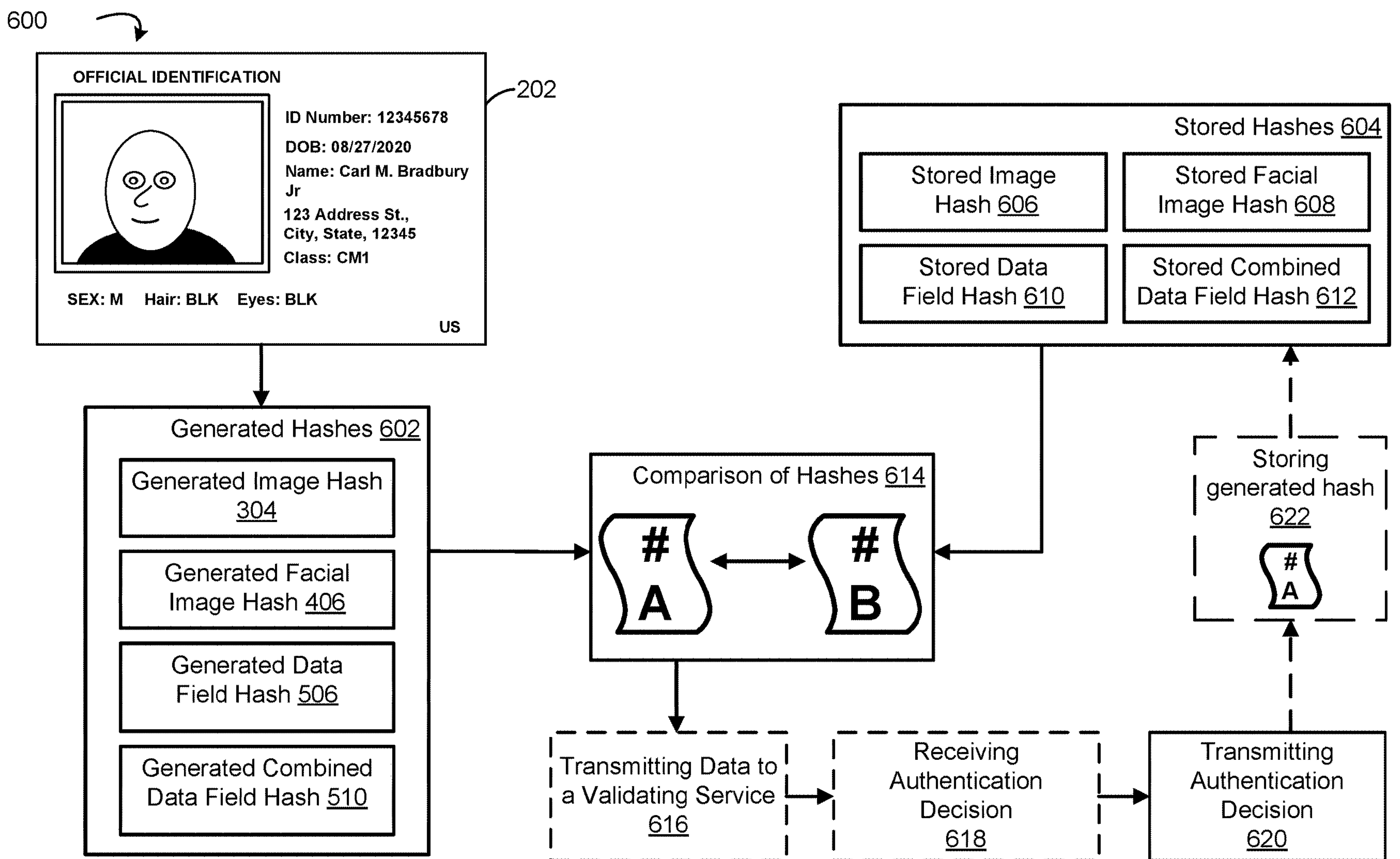
FIG. 6 illustrates a comparison of a generated hash from the reference image with a stored hash, in accordance with some embodiments.

FIG. 6 illustrates a comparison 600 of a generated hash from the received document image 200 with a stored hash, in accordance with some embodiments. In some embodiments, generated hashes 602 (e.g., generated from document image 200, which includes document 202) are compared with stored hashes 604. The generated hashes 602 include a generated image hash 304, generated facial image hash 406, generated data field hash 506, and/or generated combined data field hash 510 (e.g., the hashes generated as discussed above in FIGS. 4-6). In some embodiments, the stored hashes 604 includes corresponding hashes that were generated from a previously received image of a document. For example, stored hashes 604 includes a stored image hash 606, stored facial image hash 608, stored data field hash 610, and/or stored combined data field hash 612. The stored hashes 604 are associated with a corresponding authentication decision.

In some embodiments, the previously received image of the document is the same received document image 200 and/or document 202. For example, a document image 200 submitted at a subsequent time to authenticate the user. Alternatively and/or additionally, in some embodiments, the previously received image of the document corresponds to a document that is distinct from document image 200 and/or document 202. In some embodiments, although the previously received image of the document corresponds to a document that is distinct from document image 200 and/or document 202, the previously received image of the document includes information and/or characteristics that are identical and/or similar to document image 200, document 202, and/or their corresponding information and/or characteristics. For example, in some embodiments, the previously received image of the document is an image includes a document distinct from document 202 but includes identical facial image data 204 between the documents.

In some embodiments, the previously received image of the document was previously analyzed (e.g., by a reviewer and/or other document authentication techniques, such as live image facial comparison) to determine whether the captured document is fraudulent or authentic. The authentication decision (e.g., the previously received image of the document is fraudulent or authentic) is stored in association with one or more hashes that are generated for image, facial image, data fields, and/or combined data fields of the previously received image of the document and stored (e.g., populating stored hashes 604) into authentication database 116, local authentication database 152, and/or remote authentication database 154. For example, the stored hash of the previously received image of the document is stored (e.g., in a table of a database) and associated with an indication that the document is fraudulent or authentic. In this way, information about fraudulent and authentic documents is stored and is used for subsequent determinations of authenticity or fraud without storing human readable data corresponding to the documents.

In some embodiments, the stored hashes 604 are associated with authentication descriptions corresponding to the information about fraudulent and authentic documents. For example, authentication descriptions for rejection descriptions (e.g., document found to be fraudulent) include indications that document has been manipulated, the document is a well-known fake, verification and/or check of the machine-readable zone failed, the document is punched (e.g., hole punched), mismatch in the printed barcode data, and/or other reasons. In some embodiments, the authentication descriptions include annotations. For example, in some embodiments, the authentication descriptions include explanations and/or markings for portions of the document that were manipulated, falsified, duplicated across different documents, multiple documents with the same document number, inconsistent information, etc. In some embodiments, an authentication description corresponding to an authentic document include indications that the information is consistent, reasons for overturning a previous rejection, etc. Alternatively and/or additionally, in some embodiments, stored hashes 604 are associated with a time stamp and used to determine the frequency and/or inconsistent use of document image data 200 and/or document 202.

In some embodiments, the stored hashes 604 (e.g., generated using the previously received image of the document) are used to determine whether a generated hash from the generated hashes 602 corresponds to an authentic or fraudulent document. For example, comparison of the hashes 614, specifically, comparison of a generated hash of the generated hashes 602 with a corresponding hash of the stored hashes 604, is performed to determine whether matching criteria is met. In some embodiments, meeting the image matching criteria results in an automatic authentication decision. For example, a generated image hash 304 is compared with a stored image hash 606 to determine whether the generated image hash 304 meets image matching criteria. In some embodiments, if it is determined that the generated image hash 304 meets the image matching, the authentication decision associated with the stored image hash is transmitted 620 to a remote third party (e.g., image capturing device 190*a* and/or client 190*b*). In this way, an authentication decision (e.g., either authentic or fraudulent) is determined automatically for document image 200 and/or document 202 by utilizing the authentication decisions associated with the stored hashes 604.

In some embodiments, in accordance with a determination that the generated image hash 304 does not meet the image matching criteria, comparison of hashes 614, other than the generated image hash 604, is performed with corresponding stored hashes (stored facial image hash 608, stored combined data field hash 612, and/or stored data field hash 610) to determine whether corresponding matching criteria is met. For example, a generated facial image hash 406 is compared with a stored facial image hash 608 to determine whether facial image matching criteria is met. In some embodiment, the comparison of hashes 614, other than the generated image hash 304, are performed concurrently. For instance, a generated facial image hash 406, generated combined data field hash 510, and/or generated data field hash 506 are compared with corresponding stored hashes at the same time.

In some embodiments, in accordance with a determination that a generated hash of the generated hashes 602 other than the generated image hash 304, meets corresponding matching criteria results in transmitting data 616 for display on a remote device associated with a validating service 195. The transmitted data 616 includes the authentication decision associated with the corresponding storage hash and document image data (e.g., at least one of document image 200, document 202, facial image data 402 and/or facial features 404, determined data fields 504, etc.). For example, in accordance with a determination that a generated data field 510 corresponding to a document number (e.g., 510*c*) meets matching criteria with a stored data field hash 610 corresponding to a document number, data 616 is transmitted to a validating service 195. The stored authentication decision and the document image 200 data is provided to the validating service 195 to review and verify the stored authentication decision and/or determine a different authentication decision.

In some embodiments, in accordance with a determination that a generated hash (e.g., generated facial image hash 506, generated combined data field hash 510, etc.) of the generated hashes 602 other than the generated image hash 304 meets matching criteria, generated data field hashes 506 are compared with corresponding stored data field hashes 610 to determine generated data field hashes 506 that are distinct from stored data field hashes. In some embodiments, if a generated data field hash 506 is distinct from a corresponding stored data field hash that is associated with an authentication decision, a conflict indication corresponding to the generated data field 506 is transmitted to the validating service 195. In this way, the validating service 195 is provided with the authentication decision associated with the stored hash as well as an indication of data fields that are distinct.

For example, in some embodiments, a generated combined data field hash 510 includes a combination of determined data fields for a document number, name, and/or DOB (e.g. 508*c*; FIG. 5) and is compared with a corresponding stored combined data field hash 612 that is associated with an authentication decision. If it is determined that the generated combined data field hash 510 meets the matching criteria, generated data field hashes 506 (e.g., other than the ones included in the generated combined data field hash 510) are compared with corresponding stored data field hashes 610. Generated data field hashes 506 that are distinct from corresponding stored data filed hashes 610 indicate a conflict. For instance, if the generated data field hash 506 corresponding to the document type were to indicate "driver's license", but the stored data field hash 610 corresponding to the document type indicated "passport", then a conflict would be indicated. The distinction is provided to the validating service 195 for review and verification.

In this way, a validating service 195 may receive an authentication decision that indicates that a document is authentic as well as indications of inconsistencies in data fields. The indications of inconsistencies may alert the verification service 195 of potential document manipulations. Similarly, a validating service 195 may receive an authentication decision that indicates that a document is fraudulent, but upon review of data fields that were alerted as inconsistent, the verification service 195 may decide that the document is authentic. For instance, a typographical error, blurry data fields corresponding document 202, obstructions of data field information, and/or other factors that result in that result in unreadable information and/or inconsistent readings. Additionally and/or alternatively, other similarities and/or inconsistencies between documents are used to determine the authenticity of a document image 200. For example, repeated use of identical information (e.g., determined by analyzing associated time stamps), gradual changes and/or adjustments to in information (e.g., such as a change from a name "Bradbury" to "Bradburry"), combined information from several distinct documents, highly similar information (e.g., dates separated by a day, identical document numbers between documents, etc.), and/or other variations in the documents are used to determine the presence of conflicts and areas that require further review by a validating service 195.

In some embodiments, an authentication decision is received 618 from the validating service 195 corresponding to the generated hash 602 for which data 616 was transmitted. The authentication decision includes a rejection (e.g. document is fraudulent) or authorization (e.g. document is authentic). In some embodiments, the validating service 195 provides an authentication description corresponding to the authentication decision. In some embodiments, the authentication decision received from the validating service 195 is transmitted 620 to a remote third party (e.g., image capturing device 190*a* and/or client server 190*b*).

In some embodiments, the received authentication 618 is associated with the generated hashes 602 and stored 622 for use in subsequent transaction and or authentications. For example, if it is determined that the generated facial image hash 510 meets the corresponding matching criteria, then the generated image matching criteria did not meet the matching criteria. Therefore, the generated image hash 304 is associated with the received authentication decision 618 and stored 622. Additionally and/or alternatively, if the generated facial image hash 510 meets the matching criteria, but the received authentication decision 618 is distinct, the generated facial image hash 510 is associated with the received authentication decision 618 and stored 622. This enables a validating service 195 to update authentication decisions changes based on further review and conflicting indications. The generated hashes 604 associated with the received authentication decision 618 are stored in the authentication database 116, local authentication database 152, and/or remote authentication database 154. Additionally and/or alternatively, in some embodiments, the authentication descriptions associated with the received authentication decision 618 are stored.

On the other hand, if it is determined that the generated hashes 602 do not meet the matching criteria, the received document image 202 is treated as a new document and authenticated utilizing other authentication techniques distinct from those discussed herein. Other authentication techniques include full analysis of the image data and/or the document, liveness comparison, multiple captures of the document, etc. In some embodiments, the authentication server 100 and the validating service 195 operate in conjunction to complete the authentication of the new document. For example, the authentication server 100 transmits to the validating service 195 the analyzed and processed portions of document 202, such as the identified facial image data 402, facial features 404, determined data fields 504, etc.

In some embodiments, received document image 200 is rejected due to poor quality of the image capture, blurry and/or unreadable data fields, obstructed information of document 202, improper and/or invalid submission of document 202 (e.g., submitting a black in white document instead of a color document). In some embodiments, authentication server 100 request from a remote third party (e.g., image capturing device 190*a* and/or the client server 190*b*) a new capture of document 202, a different document, and/or resubmission of the document data 200. In some embodiments, resubmission of a document image is requested if an authentication decision cannot be made with the provided information.

Figure 7A:
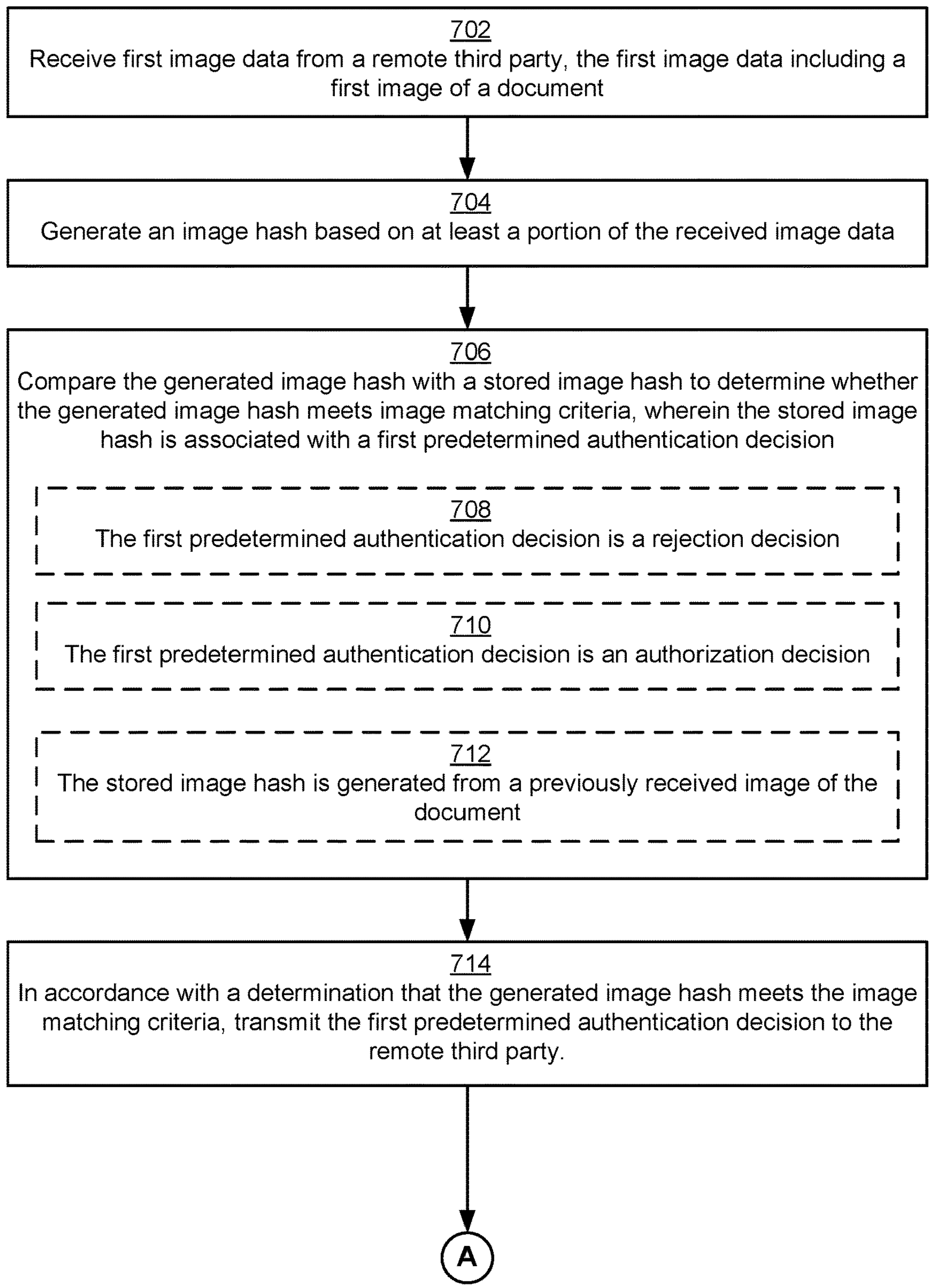

FIG. 7 is a flow diagram illustrating a method 700 for using generated hashes to authenticate a document, in accordance with some embodiments. The method is performed at an authentication server 100 and/or other computing system. For example, instructions for performing the method are stored in the memory 102 and executed by the processor(s) 140 of the authentication server computer system 100.

The authentication server 100 receives (702) first image data, such as document image 200, from a remote third party (e.g., image capturing device 190*a* and/or client device 190*b*). The first image data including a first image of a document (e.g., document 202). The authentication server 100 generates (704) an image hash 304 based on at least a portion of the received image data (e.g. document image 200 and/or determined image portion 302). The Authentication server 100 compares (706) the generated image hash 304 with a stored image hash 606 to determine whether the generated image hash 304 meets image matching criteria, wherein the stored image hash is associated with a first predetermined authentication decision. In some embodiments, the first predetermined authentication decision is a rejection decision (708). In some embodiments, the first predetermined authentication decision is an authorization decision (710).

In some embodiments, the stored image hash 606 is generated (712) from a previously received image of the document. For example, as discussed above in FIG. 6, a stored image hash 610 is generated from a previously received image of a document that is associated with an authentication decision. In some embodiments, previously received image of the document is distinct from the received document image 200 and/or includes a document that is distinct from document 202.

In accordance with a determination that the generated image hash 304 meets the image matching criteria, authentication server 100 transmits (714) the first predetermined authentication decision to the remote third party. As described above in FIG. 6, a determination that the generated image hash 304 meets matching criteria when compared to a stored image hash 606 enables authentication system 100 to automatically transmit an authentication decision to the remote third party. If the generated image hash 304 meets image matching criteria, authentication server 100 does not provide information to a validating service 195.

In some embodiments, in accordance with a determination that the generated image hash does not meet the image matching criteria (716), authentication server 100 determines (716-*a*) a set of one or more additional characteristics associated with the image of the document. Authentication server 100 generates (716-*b*) at least one respective hash that corresponds to at least one respective characteristic of the set of one or more additional characteristics. In some embodiments, characteristics associated with the image of the document include facial image data 402, facial features 404, determined data fields 504, and/or combination of data fields 508 as discussed above in FIG. 4 and FIG. 5. Authentication server 100 compares (716-*c*) a first respective hash that corresponds to a first respective characteristic with a first stored respective hash that corresponds to the first respective characteristic to determine whether the first respective hash meets characteristic matching criteria, wherein the first stored respective hash is associated with a second predetermined authentication decision. In accordance with a determination that the first respective hash meets the characteristic matching criteria, Authentication server 100 transmits (716-*d*), for display by a remote device associated with a validating service 195 the second predetermined authentication decision and a subset of the set of one or more additional characteristics associated with the image of the document. Authentication server 100 receives (716-*e*) a first authentication decision from the validating service and transmits (716-*f*) the first authentication decision to the remote third party. In some embodiments, first authentication decision is distinct from the predetermined authentication decision.

For example, as discussed above in FIG. 6, if image matching criteria is not met, authentication server 100 proceeds to compare the generated hashes for facial image data 402, determined data fields 504, and/or combined data fields 508 to determine if corresponding matching criteria are met. If it is determined that the corresponding matching criteria are met, the validating service 195 is provided, for display on an associated remote device, the corresponding authentication decision associated with the compared stored hash and information corresponding to at least one of the facial image data 402, facial features of extracted facial image 404, determined data fields 504, and/or combination of data fields 508 to perform a final review. The authentication server 100 receives from the validating server 195 an authentication decision for the compared generated hash 602 and transmits the authentication decision to the remote third party (e.g., image capturing device 190*a* and/or client server 190*b*). In some embodiments, the authentication decision provided by the validating service 195 is the same as the authentication decision associated with the compared stored hash 604. In some embodiments, the authentication decision provided by the validating service 195 is distinct from the authentication decision associated with the compared stored hash 604 (e.g., upon review, the verification service 195 determines that the received document image 200 and/or document 202 is distinct from the previously received image data warranting an independent authentication decision).

In some embodiments, the first respective characteristic (718) is facial image data 402, wherein the facial image data 402 is included in the first image of the document 202, the first respective hash is a generated facial image hash (e.g. 406), and the first stored respective hash is a stored facial image hash 608. In some embodiments, the facial image hash 406 is generated based on the determined facial features (FIG. 4). In some embodiments, the stored facial hash is determined (720) based on a previously received image of the document. In some embodiments, the first stored respective hash that corresponds to the first respective characteristic is generated (722) from a previously received image of the document. For example, a stored facial image hash is generated from a previously received image of the document (e.g., as discussed in FIG. 6).

In some embodiments, the set of one or more additional characteristics associated with the image of the document include (724) one or more data fields, wherein the one or more data fields are included in the first image of the document and the subset of the set of one or more additional characteristics associated with the image of the document include the one or more data fields. For example, in some embodiments, if it is determined that the matching criteria for a generated hash 602 meets the matching criteria, the verification service 195 is provided the authentication decision and information corresponding to document 202, such as one or more data fields. In some embodiments, the validating service 195 is provided at least one of determined data fields 504, facial image data 402 and/or facial features 404, a combination of data fields 508, etc.

In some embodiments, the first respective characteristic is a first data field from the one or more data fields, wherein the first data field is a document number (726), the first respective hash is a generated first data field hash; and the first stored respective hash is a stored first data field hash. Additionally and/or alternatively, in some embodiments, the first respective characteristic includes (728) a combination of data fields from the one or more data fields, the first respective hash is a generated combined data fields hash, and the first stored respective hash is a stored combined data fields hash. For example, in some embodiments, authentication server 100 determines the authentication decision for a document 202 based on the document number. If it is determined that a generated hash 602 corresponding to a data filed hash for the document number meets the matching criteria, the authentication decision associated with the corresponding stored hash 604 for the document number is used to determine the authenticity of document 202.

In some embodiments, in accordance with a determination that the first respective hash does not meet the characteristic matching criteria (730), authentication server 100 transmits (730-*a*), for display by the remote device associated with a validating service, at least one of the first image data or the set of one or more additional characteristics associated with the image of the document. Authentication server 100 receives (730-*b*) a second authentication decision from the remote validating service and transmits (730-*c*) the second authentication decision to the remote third party. For example, as described in FIG. 6, if it is determined that the generated image hashes 602 do not meet the matching criteria, the received document image 200 and/or document 202 are treated as new and/or not yet authenticated. The authentication server 100 transmits to the validating service 195 analyzed and processed data corresponding to document 202 to facilitate the authentication of the document. The analyzed and processed data include at least one of the facial image data 402, facial features 404, determined data fields 504, and/or combination of data fields 508. In some embodiments, the second authentication decision is distinct from the first authentication decision and/or the predetermined authentication decision.

In some embodiments, after receiving the second authentication decision from the validating service, authentication server 100 stores (732) the generated image hash and the first respective hash that corresponds to the first respective characteristic, wherein each the generated image hash and the first respective hash that corresponds to the first respective characteristic are associated with the second authentication decision. For example, as discussed above in FIG. 6, the generated hashes 602 are associated with the received authentication decision and stored. The stored generated hashes 602 are used for future authentication and/or transactions. In some authentication server 100 receives (734), from the validating service, a second authentication description, wherein the second authentication description is associated with the second authentication decision and stores the second authentication description.

Figure 8:
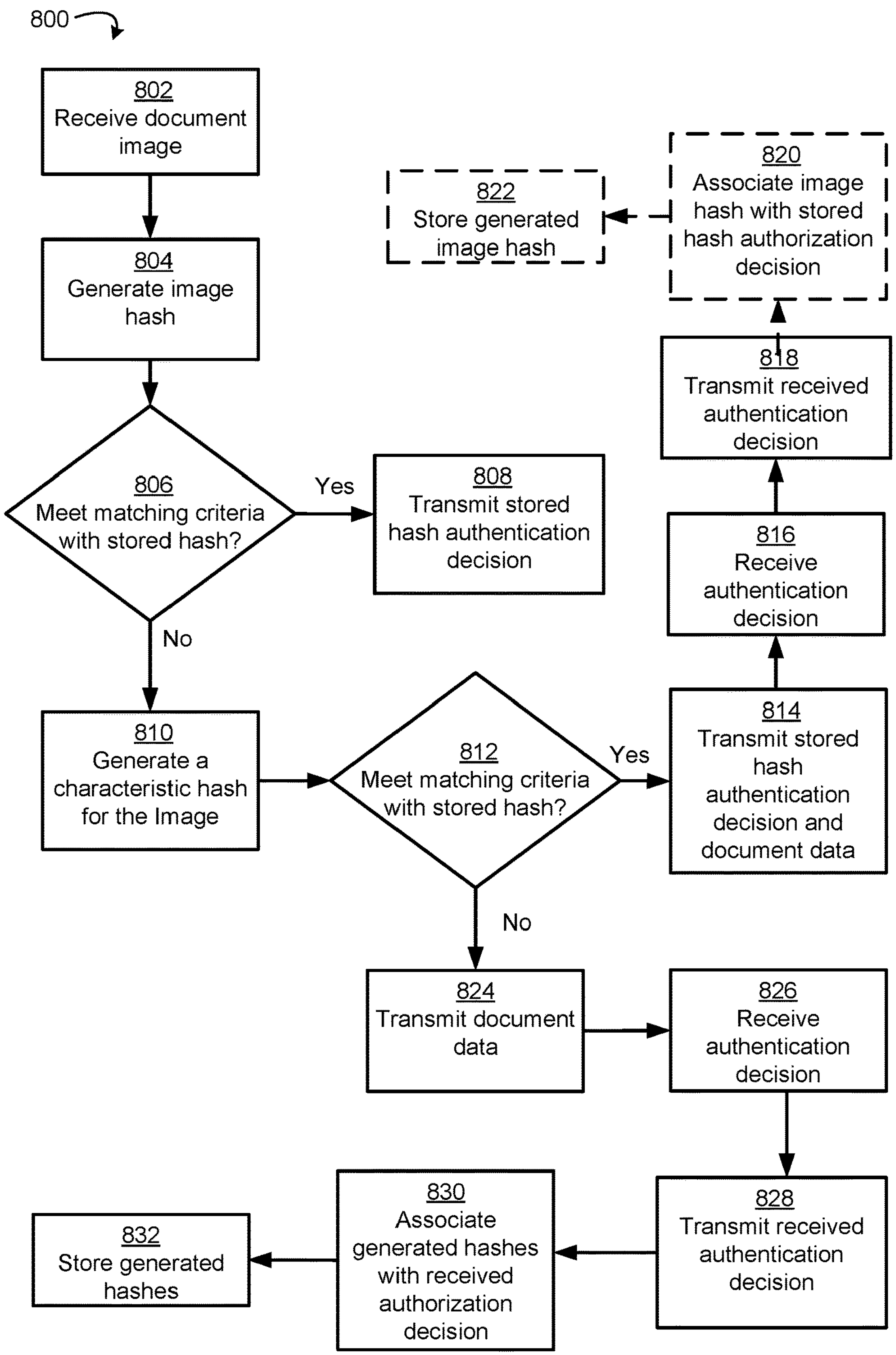
FIG. 8 is a flow diagram that illustrates an exemplary approach to comparing a generated image hash with a stored image hash that is associated with a predetermined authentication decision.

FIG. 8 is a flow diagram illustrating one embodiment of a method 800 for authenticating a document utilizing generated hashes, in accordance with some embodiments. At operation 802, a document image is received and initiates the process. As described above, the document may include passports, driver's license, facility cards, security cards, identification cards, billing documents, etc. At operation 804, the method 800 generates an image hash based on the received document image data. The generated image hash includes the entire document image 200 and/or a portion of document image data 200 that includes the document 202 (e.g., as described above in FIG. 4).

At operation 806, the method 800 determines whether the generated image hash meets image matching criteria with a stored image hash. If it is determined that the stored image hash 804 meets image matching criteria with a stored image hash, then, at operation 808, the method 800 transmits the authentication decision associated with the stored image hash to the remote third party (e.g., image capturing device 190*a* and/or client server 190*b*). For example, as discussed above in FIG. 6, a stored hash 604 is associated with an authentication decision that includes either an indication of rejection (e.g., fraudulent document) or authorization (e.g., authentic document) and based on a determination that the matching criteria is met, then method 800 would provide the same authentication decision to the remote third party for the document image 200 received at operation 802.

If, instead, it is determined that the image matching criteria is not met at operation 806, then the method 800 proceeds to operation 810 and generates characteristic hashes for document image 200 received at operation 802. Generated characteristic hashes includes facial image hash 406, data field hashes 506, and/or combined data field hashes 510 (e.g., as discussed in FIGS. 5 through FIG. 6). At operation 812, method 800 determines whether matching criteria are met for at least one characteristic of the generated hashes corresponding to the received document 200 when compared with a corresponding stored characteristic hash. For example, a facial image hash 406 is compared with a stored facial image hash 608 to determine whether facial matching criteria are met. If it is determined that the facial image hash 406 meets the facial matching criteria at operation 812, then, at operation 814 method 800 transmits, for display by a remote device associated with a validating service 195 the authentication decision associated with the stored facial image hash (e.g., as discussed above in FIG. 6) and/or document data (e.g., at least one of document image 200, facial image data 204, data fields 504, etc.; as discussed above in FIG. 2 through FIG. 5). In this way, the validating service is provided with an initial indication of authentication (e.g., rejection or authorization) and is provided information corresponding to the document 202 to review and make an authentication decision.

At operation 816, method 800 receives the authentication decision from the validating service 195 and at operation 818 transmits the received authentication decision to the remote third party (e.g., image capturing device 190*a* and/or client server 190*b*). In some embodiments, at operation 820, the generated image hash 304 (e.g., generated at operation 804) that did not meet image matching criteria is associated with the authorization decision received at operation 816. At operation 822, method 800 stores the generated image hash 304 that was associated with the authorization decision for use in subsequent transaction and/or authentications.

If, instead, at operation 812 it is determined that at least one characteristic of the generated hashes corresponding to the received document image 200 do not meet matching criteria with a stored hash, then the received document image 200 is treated as a new image. For new images, authentication techniques are performed to determine the authenticity of document 202. Authentication techniques includes review of the document image by agents associated with the validating service 195 and/or use of facial recognition technology; liveness detection; security features detection (e.g. holograms); etc. Having performed the initial processing (e.g., facial image data detection and/or analysis, data field analysis and/or character recognition, etc.; for example as discussed above in FIG. 3 through FIG. 5), method 800 transmits, for display by the remote device associated with a validating service 195, document data at operation 824. At operation 826, method 800 receives an authentication decision and transmits the authentication decision to a remote third party (e.g., image capturing device 190*a* and/or client device 190*b*) at operation 828.

At operation 830, the generated image hash 304, the generated facial image hash 406, the generated combined data fields hash 510, and/or the generated data fields hash 506 are associated with the authentication decision received at operation 826. The generated hashes associated with the authentication decision received at operation 826 are stored at operation 832 for use in subsequent transaction.

For simplicity, the facial image hash 406 was discussed for operation 812 through operation 832; however, determining whether matching criteria is met at operation 812 may be performed concurrently with other characteristics such generated combined data fields hash 510 (e.g., First Name, Last Name, DOB, country, document type; document number, country, document type; etc.) and/or generated data field hash 506 (e.g., document number hash 506*c*). Similarly, determining whether matching criteria is met at operation 812 may be performed one characteristic at a time such as generated facial image hash 406, generated combined data field hash 510, and/or generated data field hash 506.

It should be understood that the particular order in which the operations in FIG. 6 through FIG. 8 have been described are merely examples and are not intended to indicate that the described order is the only order in which the operations could be performed. One of ordinary skill in the art would recognize various ways to reorder the operations described herein.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 102) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, the memory 102 include one or more storage devices remotely located from the CPU(s) 104. The memory 102, or alternatively the non-volatile memory device(s) within this memory, comprises a non-transitory computer readable storage medium.

Communication systems as referred to herein (e.g., the communication system 108) optionally communicate via wired and/or wireless communication connections. Communication systems optionally communicate with networks (e.g., the network 170), such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

The invention claimed is:

1. A server system comprising:

one or more processors; and memory coupled to the one or more processors, the memory storing one or more programs configured to be executed by the one or more processors, the one or more programs including instructions for:

receiving first image data from a remote third party, the first image data including a first image of a document;

generating an image hash based on at least a portion of the received image data;

comparing the generated image hash with a stored image hash to determine whether the generated image hash meets image matching criteria, wherein the stored image hash is associated with a first predetermined authentication decision;

in accordance with a determination that the generated image hash meets the image matching criteria, transmitting the first predetermined authentication decision to the remote third party;

in accordance with a determination that the generated image hash does not meet the image matching criteria, determining a set of one or more additional characteristics associated with the image of the document;

generating at least one respective hash that corresponds to at least one respective characteristic of the set of one or more additional characteristics;

comparing a first respective hash that corresponds to a first respective characteristic with a first stored respective hash that corresponds to the first respective characteristic to determine whether the first respective hash meets characteristic matching criteria, wherein the first stored respective hash is associated with a second predetermined authentication decision;

in accordance with a determination that the first respective hash meets the characteristic matching criteria, transmitting, for display by a remote device associated with a validating service:

the second predetermined authentication decision; and a subset of the set of one or more additional characteristics associated with the image of the document;

receiving a first authentication decision from the validating service; and transmitting the first authentication decision to the remote third party.

2. The server system of claim 1, wherein the first predetermined authentication decision is a rejection decision.

3. The server system of claim 1, wherein the first predetermined authentication decision is an authorization decision.

4. The server system of claim 1, wherein the stored image hash is generated from a previously received image of the document.

5. The server system of claim 1, further comprising after receiving the first authentication decision from the validating service, storing the generated image hash, wherein the generated image hash is associated with the first authentication decision.

6. The server system of claim 1, further comprising receiving, from the validating service, a first authentication description, wherein the first authentication description is associated with associated with the first authentication decision; and storing the first authentication description.

7. The server system of claim 6, wherein the first authentication description includes at least one indication of error or indication of authenticity.

8. The server system of claim 1, wherein the first stored respective hash that corresponds to the first respective characteristic is generated from a previously received image of the document.

9. The server system of claim 1, wherein:

the first respective characteristic is facial image data, wherein the facial image data is included in the first image of the document;

the first respective hash is a generated facial image hash; and the first stored respective hash is a stored facial image hash.

10. The server system of claim 9, wherein the stored facial hash is determined based on a previously received image of the document.

11. The server system of claim 1, wherein the set of one or more additional characteristics associated with the first image of the document include one or more data fields, wherein the one or more data fields are included in the first image of the document; and the subset of the set of one or more additional characteristics associated with the first image of the document include the one or more data fields.

12. The server system of claim 11, wherein:

the first respective characteristic is a first data field from the one or more data fields, wherein the first data field is a document number;

the first respective hash is a generated first data field hash; and the first stored respective hash is a stored first data field hash.

13. The server system of claim 11, wherein:

the first respective characteristic includes a combination of data fields from the one or more data fields;

the first respective hash is a generated combined data fields hash; and the first stored respective hash is a stored combined data fields hash.

14. The server system of claim 1, further comprising:

in accordance with a determination that the first respective hash does not meet the characteristic matching criteria, transmitting, for display by the remote device associated with a validating service, at least one of the first image data or the set of one or more additional characteristics associated with the image of the document;

receiving a second authentication decision from the validating service; and transmitting the second authentication decision to the remote third party.

15. The server system of claim 1, further comprising after receiving the second authentication decision from the validating service, storing the generated image hash and the first respective hash that corresponds to the first respective characteristic, wherein the generated image hash and the first respective hash that corresponds to the first respective characteristic are associated with the second authentication decision.

16. The server system of claim 1, further comprising receiving, from the validating service, a second authentication description, wherein the second authentication description is associated with the second authentication decision; and storing the second authentication description.

17. A method of identifying a remote user, comprising:

at a server system associated with a first entity, the server system having one or more processors and memory storing instructions for execution by the one or more processors:

receiving first image data from a remote third party, the first image data including a first image of a document;

generating an image hash based on at least a portion of the received image data;

comparing the generated image hash with a stored image hash to determine whether the generated image hash meets image matching criteria, wherein the stored image hash is associated with a first predetermined authentication decision; and in accordance with a determination that the generated image hash meets the image matching criteria, transmitting the first predetermined authentication decision to the remote third party;

in accordance with a determination that the generated image hash does not meet the image matching criteria, determining a set of one or more additional characteristics associated with the image of the document;

generating at least one respective hash that corresponds to at least one respective characteristic of the set of one or more additional characteristics;

comparing a first respective hash that corresponds to a first respective characteristic with a first stored respective hash that corresponds to the first respective characteristic to determine whether the first respective hash meets characteristic matching criteria, wherein the first stored respective hash is associated with a second predetermined authentication decision;

in accordance with a determination that the first respective hash meets the characteristic matching criteria, transmitting, for display by a remote device associated with a validating service:

the second predetermined authentication decision; and a subset of the set of one or more additional characteristics associated with the image of the document;

receiving a first authentication decision from the validating service; and transmitting the first authentication decision to the remote third party.

18. A non-transitory computer-readable storage medium storing one or more programs, the one or more programs comprising instructions, which when executed by a server system associated with a first entity, cause the server system to:

receive first image data from a remote third party, the first image data including a first image of a document;

generate an image hash based on at least a portion of the received image data;

compare the generated image hash with a stored image hash to determine whether the generated image hash meets image matching criteria, wherein the stored image hash is associated with a first predetermined authentication decision; and in accordance with a determination that the generated image hash meets the image matching criteria, transmit the first predetermined authentication decision to the remote third party;

in accordance with a determination that the generated image hash does not meet the image matching criteria, determine a set of one or more additional characteristics associated with the image of the document;

generate at least one respective hash that corresponds to at least one respective characteristic of the set of one or more additional characteristics;

compare a first respective hash that corresponds to a first respective characteristic with a first stored respective hash that corresponds to the first respective characteristic to determine whether the first respective hash meets characteristic matching criteria, wherein the first stored respective hash is associated with a second predetermined authentication decision;

in accordance with a determination that the first respective hash meets the characteristic matching criteria, transmit, for display by a remote device associated with a validating service:

the second predetermined authentication decision; and a subset of the set of one or more additional characteristics associated with the image of the document;

receive a first authentication decision from the validating service; and transmit the first authentication decision to the remote third party.

* * * * *